United States Patent
Liu et al.

(10) Patent No.: US 12,457,134 B2
(45) Date of Patent: Oct. 28, 2025

(54) METHOD FOR IMPLEMENTING UPLINK AND DOWNLINK CHANNEL RECIPROCITY, COMMUNICATION NODE, AND STORAGE MEDIUM

(71) Applicant: ZTE CORPORATION, Shenzhen (CN)

(72) Inventors: Lei Liu, Shenzhen (CN); Shuqiang Xia, Shenzhen (CN); Guanghui Yu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 416 days.

(21) Appl. No.: 17/923,985

(22) PCT Filed: Mar. 4, 2021

(86) PCT No.: PCT/CN2021/079070
§ 371 (c)(1),
(2) Date: Nov. 8, 2022

(87) PCT Pub. No.: WO2021/223504
PCT Pub. Date: Nov. 11, 2021

(65) Prior Publication Data
US 2023/0179451 A1    Jun. 8, 2023

(30) Foreign Application Priority Data
May 8, 2020 (CN) .......................... 202010383236.3

(51) Int. Cl.
*H04L 25/02* (2006.01)
*G06N 3/084* (2023.01)

(52) U.S. Cl.
CPC ...... *H04L 25/0254* (2013.01); *H04L 25/0242* (2013.01); *G06N 3/084* (2013.01)

(58) Field of Classification Search
None
See application file for complete search history.

(56) References Cited

U.S. PATENT DOCUMENTS

| 10,644,916 B1 * | 5/2020 | Shattil .................... H04B 7/026 |
| 2017/0279508 A1 | 9/2017 | Truong et al. |

(Continued)

FOREIGN PATENT DOCUMENTS

| CN | 104871437 A | 8/2015 |
| CN | 108566257 A | 9/2018 |

(Continued)

OTHER PUBLICATIONS

Extended European Search Report in Application No. 21800355.6, dated May 6, 2024, 9 pages.

(Continued)

*Primary Examiner* — Clemence S Han
(74) *Attorney, Agent, or Firm* — Morgan, Lewis & Bockius LLP

(57) ABSTRACT

A method for implementing uplink and downlink channel reciprocity, a communication node, and a storage medium are provided. The method for implementing uplink and downlink channel reciprocity includes: performing channel estimation in real time according to a received reference signal to obtain a channel estimation result; inputting the channel estimation result into a pre-trained neural network model, to output a channel adaptive matrix; and performing channel adaptation processing on a transmission signal by applying the channel adaptive matrix to the transmission signal.

19 Claims, 4 Drawing Sheets

(56) References Cited

U.S. PATENT DOCUMENTS

2018/0260702 A1    9/2018  Yamamoto et al.
2021/0399812 A1*  12/2021  Xiong .................. H04B 17/318
2022/0196787 A1*   6/2022  Ayyalasomayajula ......................
                                                       G01C 21/206

FOREIGN PATENT DOCUMENTS

| CN | 10833313 A | 11/2018 |
| CN | 108833313 A | 11/2018 |
| CN | 109379120 A | 2/2019 |
| CN | 110266620 A | 9/2019 |
| CN | 110365613 A | 10/2019 |
| CN | 111901258 A | 11/2020 |

OTHER PUBLICATIONS

Chinese Office Action in Application No. 202010383236.3, dated May 30, 2024, 8 pages including translation.

Chinese Search Report in Application No. 202010383236.3, dated May 29, 2024, 6 pages including translation.

Maeda Yutaka et al: "Learning Scheme for Complex Neural Networks Using Simultaneous Perturbation", Jun. 14, 2011 (Jun. 14, 2011), SAT 2015 18th International Conference, Austin, TX, USA, Sep. 24-27, 2015; [Lecture Notes in Computer Science; Lect.Notes Computer], Springer, Berlin, Heidelberg, pp. 462-469.

Safari Mohammad Sadegh et al: "Deep UL2DL: Data-Driven Channel Knowledge Transfer From Uplink to Downlink", IEEE Open Journal of Vehicular Technology, IEEE, vol. 1, Dec. 27, 2019 (Dec. 26, 2019), pp. 29-44.

Wang Jie et al: "UL-CSI Data Driven Deep Learning for Predicting DL-CSI in Cellular FDD Systems", IEEE Access, vol. 7, Jul. 16, 2019 (Jul. 16, 2019), pp. 96105-96112.

Yang Yuwen et al: "Deep Learning-Based Downlink Channel Prediction for FDD Massive MIMO System", IEEE Communications Letters, IEEE Service Center, Piscataway, NJ, US, vol. 23, No. 11, Nov. 1, 2019 (Nov. 1, 2019), pp. 1994-1998.

International Search Report in Application No. PCT/CN2021/079070, dated May 26, 2021, 4 pages including English translation.

\* cited by examiner

| Module for uplink and downlink channel reciprocity in a FDD system | Channel data set | Accuracy of testing for generalization performance | |
|---|---|---|---|
| Complex convolutional neutron model | 30-path with only amplitude random (12000 samples) | 4800 fresh samples | 99.15% |
| | | 6000 fresh samples | 99.98% |
| | 30-path with only phase random (12000 samples) | 3000 fresh samples | 99.43% |
| | | 5000 fresh samples | 99.40% |
| | 30-path with both amplitude and phase random (12000 samples) | 3200 fresh samples | 99.75% |
| | | 4000 fresh samples | 99.69% |

FIG. 4

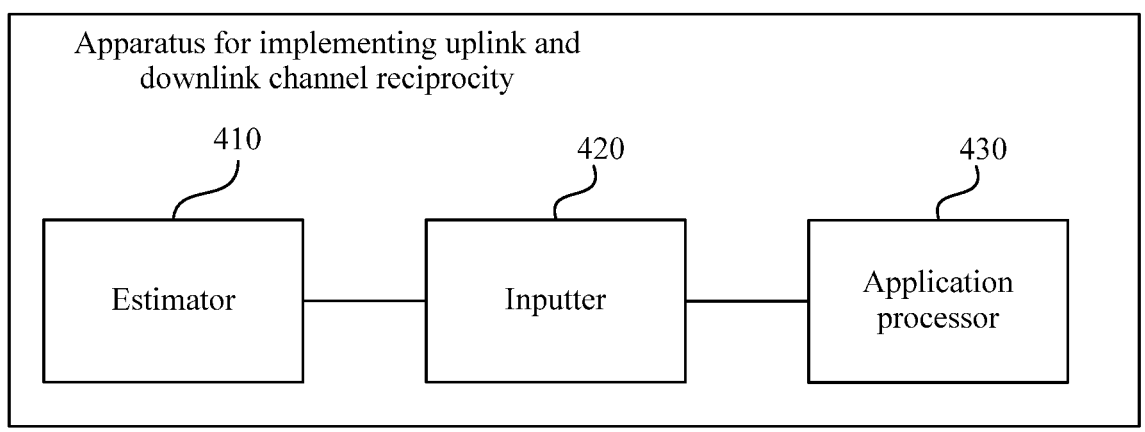

FIG. 5

METHOD FOR IMPLEMENTING UPLINK AND DOWNLINK CHANNEL RECIPROCITY, COMMUNICATION NODE, AND STORAGE MEDIUM

CROSS REFERENCE TO RELATED APPLICATIONS

This is a National Stage Application filed under 35 U.S.C. 371, based on International Patent Application No. PCT/CN2021/079070, filed on Mar. 4, 2021, which claims priority to Chinese Patent Application No. 202010383236.3 filed May 8, 2020, the disclosures of which are incorporated herein by reference in their entireties.

FIELD

The application relates to the field of communication, for example, to a method for implementing uplink and downlink channel reciprocity, a communication node and a storage medium.

BACKGROUND

In a conventional frequency division duplex (FDD) system, in the process that a base station (BS) side performs downlink channel adaptation (i.e., pre-coding) according to channel state information (CSI), for example, pre-coding matrix indicator (PMI) fed back by user equipment (UEs), the following defects are presented.

First, in the FDD system, there is usually a large interval between the communication carrier frequency band of uplink (the signal pathway from the UE to the BS) and the communication carrier frequency band of downlink (the signal pathway from the BS to the UE), which makes a small error of multipath delay estimation of wireless channel cause a significant and complex nonlinearity in a reciprocal mapping from an uplink channel to a downlink channel, or in a reciprocal mapping from a downlink channel to an uplink channel.

Secondly, the downlink channel estimation result obtained through estimation contains interference and noise, and the V matrix obtained by singular value decomposition (SVD) based on the downlink channel estimation result should be ever-changing, reflecting real-time changing of the practical channels. However, due to the limitation of storage overhead, as the quantization with limited accuracy of the channel state information, the codebook dictionary defined in the 3rd generation partnership project (3GPP) standard cannot be designed to be too large, and thus the granularity of the codebooks have to be designed to be large, and the code forms are also designed very ideal; in other words, the error in the limited quantization of the practical channel is large, which makes it difficult to apply the conventional methods defined in the 3GPP standard to adapt to changes in the practical channel state accurately.

Furthermore, the usage of pre-coding has hysteresis. Because of the large time for the calculation of SVD on the user equipment side, plus the time for the item-by-item comparison and matching between the decomposed result and the stored codebook dictionary, plus the uplink feedback time for reporting the PMI to the base station, the object which is practically applied with the pre-coding is actually a signal transmitted at a next moment or transmitted in a next frame, causing that the pre-coding obtained with the conventional methods defined in the 3GPP standard cannot be well matched to the practical downlink channel.

SUMMARY

A method for implementing uplink and downlink channel reciprocity, a communication node, and a storage medium are provided according to embodiments of the present application, which, on the basis of nonlinear of uplink and downlink channel reciprocity learned through training, ensures real-time and accuracy of channel state information and reduces storage overhead of communication nodes.

Embodiments of the present application provide a method for implementing uplink and downlink channel reciprocity, which is applied to a communication node, including: performing channel estimation in real time according to a received reference signal to obtain a channel estimation result; inputting the channel estimation result into a pre-trained neural network model, to output a channel adaptive matrix; and performing channel estimation adaption processing for a transmission signal by applying the channel adaptive matrix to the transmission signal.

Embodiments of the present application provide an apparatus for implementing uplink and downlink channel reciprocity, which is applied to a communication node, and the apparatus includes an estimator, an input device, and an application processor.

The estimator is configured to perform channel estimation in real time according to the received reference signal, to obtain a channel estimation result; the input device is configured to input the channel estimation result into a pre-trained neural network model, to output a channel adaptive matrix; and the application processor is configured to perform channel adaptive processing to a transmission signal by applying the channel adaptive matrix to the transmission signal.

Embodiments of the present application provide a communication node, which includes: a communication module, a memory, and one or more processors. The communication module is configured to perform communication interaction between at least two communication nodes; the memory is configured to store one or more programs; the one or more programs, when being executed by the one or more processors, cause the one or more processors to implement the method for implementing uplink and downlink channel reciprocity described in the above embodiments.

Embodiments of the present application provides a storage medium in which a computer program is stored, and the computer program, when being executed by a processor, implements the method for implementing uplink and downlink channel reciprocity described in the foregoing embodiments.

BRIEF DESCRIPTION OF DRAWINGS

FIG. 4 is a schematic diagram of a result of performing uplink and downlink channel reciprocity by using a complex convolutional neural network according to an embodiment of the present application;

FIG. 5 is a structural block diagram of an apparatus for implementing uplink and downlink channel reciprocity according to an embodiment of the present application.

DETAILED DESCRIPTION

Figure 1:
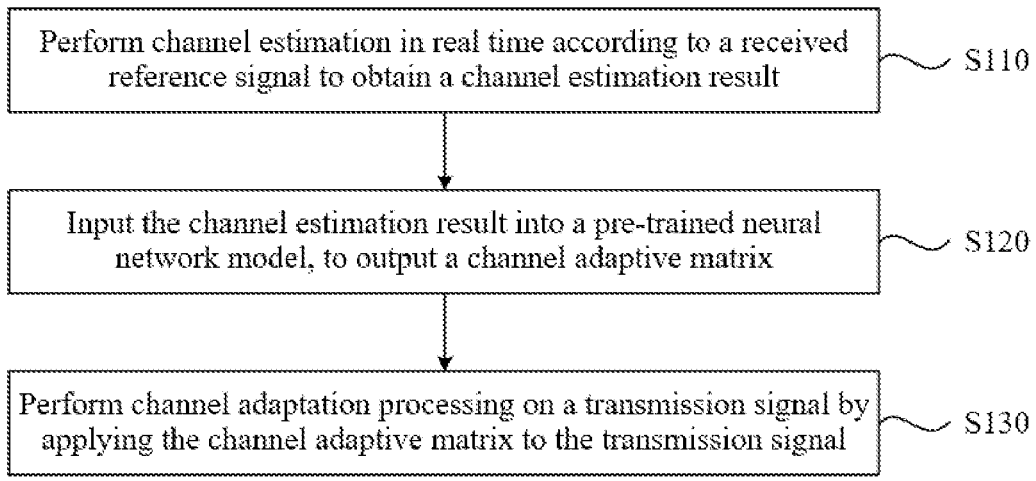
FIG. 1 is a flowchart of a method for implementing uplink and downlink channel reciprocity according to an embodiment of the present application.

Hereinafter, the embodiments of the present application are described with reference to the drawings.

In the process of adopting the conventional uplink channel adaptation and downlink channel adaptation, the following defects are presented: first, it is assumed that the uplink wireless channel and the downlink wireless channel in an FDD system are as follows:

$$\hat{H}_{UL}(f_{UL}) = \sum_{p=1}^{P} \hat{A}_p e^{-j2\pi \hat{\tau}_p \cdot f_{UL}}$$

$$\hat{H}_{DL}(f_{DL}) = \sum_{p=1}^{P} \hat{B}_p e^{-j2\pi \hat{\tau}_p \cdot f_{UL}} = \sum_{p=1}^{P} \hat{B}_p e^{-j2\pi (\hat{\tau}_p + \Delta \tau_p)(f_{UL}+\Delta f)} =$$

$$\sum_{p=1}^{P} [(\hat{B}_p e^{-j2\pi \hat{\tau}_p \cdot \Delta f}) \cdot \hat{B}_p e^{-j2\pi \hat{\tau}_p \cdot f_{UL}} \cdot \exp(-j2\pi \cdot \Delta \tau_p \cdot \Delta f)]$$

in which, $\Delta \tau_p$ (p=1, 2, . . . P) represents a multipath delay estimation error, even if the estimation error is already very small, for example, $\Delta \tau_p$ (deviation) is only 1 sampling point (e.g., 1/36.72 MHz=27.2 ns) and this accuracy is already very close to an ideal channel estimation; however, since an interval $\Delta f$ between an uplink carrier frequency band and a downlink carrier frequency band is generally from several 10 MHz to more than 100 MHz (here, it is assumed to be 60 MHz), this slight deviation still causes: $2\pi \cdot \Delta \tau_p \cdot \Delta f = 2\pi \times 60e + 6 \times 27.2e - 9 = 3.26\pi > 2\pi$, that is, the phase has gone through a complete rotation period; in addition to the additive effect of the exponential basis (exp) and the P paths, the significant and complex nonlinearity of the reciprocal mapping between the uplink and downlink channels in the FDD system is caused.

Secondly, a downlink channel estimation result obtained by estimation contains interference and noise, and finite quantization of the practical channel obtained on the basis of the downlink channel estimation result has a relatively large error, and can be hardly accurately adapted to changes of practical channel state.

Moreover, the usage of pre-coding has hysteresis.

The above are the three major bottlenecks of the conventional downlink channel adaptation method, vice versa, when to construct an uplink channel adaptive matrix by reciprocity according to the downlink channel estimation result, the same bottlenecks will be encountered. Therefore, it is an urgent issue to be addressed to realize the reciprocity of the uplink and downlink channels in the FDD system.

A method for implementing uplink and downlink channel reciprocity is proposed according to an embodiment of the present application, in which a neural network model is applied to the uplink and downlink channel reciprocity in the FDD system, that is, on the basis of uplink reference signals or downlink reference signals, real-time uplink channel estimation or downlink channel estimation is performed on a base station side or a user equipment side, and then the real-time estimation result is inputted into a trained neural network (NN), and a real-time downlink channel adaptive matrix or uplink channel adaptive matrix is directly outputted.

Taking the downlink channel adaptation as an example, and compared with the situations of delays in the three sections of the SVD calculation, the item-by-item matching with the codebook dictionary and the PMI uplink feedback, and still a large deviation presented between the quantized codebook corresponding to the PMI with respect to the practical channel in the conventional method, the embodiments in the present application have an original non-quantized version of the wireless channel estimated directly on the basis of the uplink reference signal, thereby, the practical channel state information reflected by the estimated wireless channel is more real-time and accurate.

Secondly, still taking the downlink channel adaptation as an example, since the delays in the three sections of the SVD, the matching with the codebook dictionary and the PMI reporting on the user equipment side in the conventional method are reduced, in the embodiment of the present application, simply a very short period of time of forward running operation is required, the downlink channel adaptive matrix may just be obtained, which significantly alleviates the aforementioned pre-coding usage hysteresis issue; moreover, because it is no longer necessary to design and store the codebook dictionary, the storage overheads on the base station side and the user equipment side are significantly reduced.

Furthermore, one of the advantages of neural networks is the strong fitting and learning ability for large or complex nonlinear mapping problems presented, which exactly matches with the significant and complex non-linear of mapping in reciprocity caused by the tiny multipath delay estimation error.

In addition, the complex neural networks can be applied to the uplink and downlink channel reciprocity in the FDD system as well. Those widely constructed neural networks in the mainstream learning platforms (including but not limited to: Tensorflow, Caffe and PaddlePaddle, etc.) widely used in the field of deep learning are substantially real neural networks, and the training algorithm is the error back propagation algorithm (BP) also based on real numbers. Taking Tensorflow as an example, the neuron activation function, operation functions (Convolution, BatchNormalization, Dense, etc.) of layers included in the library functions of Tensorflow, and the gradient computation function in the error back propagation algorithm do not support complex tensor operations. This is not difficult to understand, because for image recognition tasks to which the deep learning is most widely applied, there is no need for complex operations: an image is generally expressed by vectors composed of grayscale values in three colors, red, green and blue (RGB), and the grayscale value is a positive integer defined in the range of 0 to 255, and is not represented by a complex number. As another example: the widely used neuron activation function-rectified linear unit (ReLU) in mainstream learning platforms is a standard real function; its function rule is very simple: when the input is positive, the output is exactly as the input, and when the input is negative, the output is 0; the function requires to compare the magnitudes of the input and 0; but as well known, a complex number a+bj cannot be said to be greater than 0 or less than 0, and two complex numbers (a+bj and c+dj) cannot be directly compared with each other to determine which one is bigger or smaller.

In a wireless communication system, most of signals processed by the baseband are complex signals, i.e., a signal contains both amplitude information and phase information. In fact, the complex error back propagation algorithm constructed on the basis of the complex neuron activation function is not obtained simply by replacing real numbers in the real BP algorithm with complex numbers; therefore, for the case where the wireless communication system applies neural networks, a mathematical system is required in which a complex error back propagation algorithm is performed on the basis of complex signals and a complex activation function.

In an embodiment, FIG. 1 is a flowchart of a method for implementing uplink and downlink channel reciprocity according to an embodiment of the present application. This embodiment may be performed by a network side (e.g., a base station) or a user side (e.g., a user equipment). As shown in FIG. 1, this embodiment includes operation S110 to operation S130.

In operation S110, channel estimation is performed in real time according to a received reference signal to obtain a channel estimation result.

In operation S120, the channel estimation result is input into a pre-trained neural network model, to output a channel adaptive matrix.

In operation S130, channel adaptation processing is performed for a transmission signal by applying the channel adaptive matrix to the transmission signal.

In embodiments, the reference signal may be an uplink reference signal and may also be a downlink reference signal; the channel estimation result may be an uplink channel estimation result and may also be a downlink channel estimation result; the channel adaptive matrix may be an uplink channel adaptive matrix, and may also be a downlink channel adaptive matrix; the channel adaptive processing may be an uplink channel adaptive processing and may also be a downlink channel adaptive processing. Whether these parameters are uplink or downlink is up to the communication node, that is, up to whether the communication node is a first communication node or a second communication node.

In an embodiment, in a case where the communication node is a first communication node, the reference signal is an uplink reference signal; the channel estimation is an uplink channel estimation; and the channel estimation result is an uplink channel estimation result; the channel adaptive matrix is a downlink channel adaptive matrix; and the channel adaptive processing is a downlink channel adaptive processing.

In an embodiment, in a case where the communication node is a second communication node, the reference signal is a downlink reference signal; the channel estimation is a downlink channel estimation; the channel estimation result is a downlink channel estimation result; the channel adaptive matrix is an uplink channel adaptation matrix; and the channel adaptive processing is an uplink channel adaptive processing.

In an embodiment, in a case where the communication node is a first communication node (for example, the first communication node is a base station), the first communication node estimates an uplink channel estimation result according to an uplink reference signal transmitted by a second communication node; the first communication node inputs the uplink channel estimation result into a trained neural network model to output a downlink channel adaptive matrix; and the first communication node applies a downlink transmission signal to the downlink channel adaptive matrix to perform a downlink channel adaptation processing for the downlink transmission signal. In such way, the neural network model is applied to the uplink and downlink channel reciprocity in the FDD system, which, on the basis of the nonlinear of the uplink and downlink channel reciprocity learned through training, guarantees the real-time and accuracy of the channel state information, and reduces the storage overhead of the communication node.

In an embodiment, in a case where the communication node is a second communication node (for example, the second communication node is a UE), the second communication node estimates a downlink channel estimation result according to a downlink reference signal transmitted by a first communication node; the second communication node inputs the downlink channel estimation result into a trained neural network model to output an uplink channel adaptive matrix; and the second communication node applies the uplink channel adaptive matrix to an uplink transmission signal to perform an uplink channel adaptation processing for the uplink transmission signal. In such way, the neural network model is applied to the uplink and downlink channel reciprocity in the FDD system, which, on the basis of the nonlinear of the uplink and downlink channel reciprocity learned through training, guarantees the real-time and accuracy of the channel state information, and reduces the storage overhead of the communication node.

In an embodiment, the neural network model includes: a complex neural network model; the complex neural network model includes a complex convolutional neural network model; and the complex convolutional neural network includes a complex residual neural network model.

In an embodiment, two training processes for the neural network model may be configured depending on whether the wireless channel scenarios in the FDD system are divided into at least two types of scenarios.

In an embodiment, the training process for the neural network model includes:

dividing wireless channel scenarios of a frequency division duplexing (FDD) system where the communication node is located into N types of scenarios, where N is a positive integer greater than or equal to 1; performing uplink channel estimation and downlink channel estimation for each type of scenarios according to known training symbols to obtain uplink channel estimation results and first downlink channel estimation results; and sequentially inputting an uplink channel estimation result of each entry of entries in a data set corresponding to the each type of scenarios into the neural network model to output a respective second downlink channel estimation result, until an error of the respective second downlink channel estimation result with respect to a first downlink channel estimation result served as a training tag meets a preset accuracy, where the entries are data pairs each composed of a uplink channel estimation result of the uplink channel estimation results and a respective first downlink channel estimation result of the first downlink channel estimation results.

In an embodiment, each type of scenarios corresponds to one data set, that is, N types of scenarios correspond to N data sets, and each of the data sets may include M entries, where M is a positive integer greater than or equal to 1. In the process of practical training, the uplink channel estimation result of each entry in one data set can be input into a pre-trained neural network model, and a respective second downlink channel estimation result can be output until an error of the second respective downlink channel estimation result with respect to a first downlink channel estimation result served as a training tag meets a preset accuracy, and then an uplink channel estimation result of each entry in a next data set is input into the neural network model, and the respective second downlink channel estimation result outputted is compared with the first downlink channel estimation result, and so on, until all entries in all data sets are trained.

In an embodiment, the preset accuracy may be adaptively configured according to user requirements, and in a case where a user requirement is high, a lower preset accuracy can be configured, that is, the error of the second downlink channel estimation result with respect to the first downlink channel estimation result served as the training tag is required to be small, can the preset accuracy be met; and in a case where a user requirement is low, a higher preset accuracy may be configured, that is, when the error of the second downlink channel estimation result with respect to the first downlink channel estimation result served as the training tag is relatively large, the preset accuracy can be met as well.

In an embodiment, the training process for the neural network model includes:

performing uplink channel estimation and downlink channel estimation in real time according to known training symbols, to obtain uplink channel estimation results and first downlink channel estimation results; and sequentially inputting each uplink channel estimation result of uplink channel estimation results into the neural network model, and outputting a respective second downlink channel estimation result, until an error of the respective second downlink channel estimation result with respect to a first downlink channel estimation result served as a training tag meets a preset accuracy.

In an embodiment, it is performed regarding an off-line scenario that the wireless channel scenarios of the FDD system are divided into N types of scenarios, and that each type of scenarios corresponds to one data set to perform training for the neural network model; and it is performed regarding an online scenario that the uplink channel estimation and downlink channel estimation are performed in real time directly according to known training symbols and the training for the neural network model is performed.

In an embodiment, in a case where the neural network model is a complex neural network model, a complex convolutional neural network model or a complex residual network model, the neural network model is trained by using a complex error back propagation algorithm.

In an embodiment, the complex error back propagation algorithm includes: a computation expression of a partial derivative or sensitivity of a loss function E to a complex weight $W_{u,v}^{j,k}$ and a complex bias $b_v^k$ of a k-th full-connected layer in the complex neural network model shown as follows:

$$\delta_{W_{u,v}^{j,k}} \triangleq \frac{\partial E}{\partial W_{u,v}^{j,k}} = conj(x_u^j) \cdot conj(f'(x_u^j)) \cdot \delta_{x_v^k}$$

$$\delta_{b_v^k} \triangleq \frac{\partial E}{\partial b_v^k} = \delta_{x_v^k}$$

where, $W_{u,v}^{j,k}$ represents a complex weight of a connection from a u-th neuron of a j-th layer to a v-th neuron of the k-th layer in the complex neural network model; $b_v^k$ represents a bias of the v-th neuron of the k-th layer in the complex neural network model; and $x_u^j$ and $x_v^k$ represent a complex output signal of the u-th neuron of the j-th layer and a complex output signal of the v-th neuron in the k-th layer in the network respectively; f'(•) represents a derivative of a neuron activation function to an input signal; conj(•) represents a conjugate operation on a complex number.

In an embodiment, the complex error back propagation algorithm includes:

a computation expression of a partial derivative or sensitivity of a loss function E to a complex weight $\Lambda_q^k$ and a complex bias $b_q^k$ of a q-th kernel of the k-th convolutional layer in the complex neural network model shown as follows:

$$\vec{\delta}_{\vec{\Lambda}_q^k} \triangleq \frac{\partial E}{\partial \vec{\Lambda}_q^k} = \sum_{p=1}^{P} Conv\left(Fliplr(conj(\vec{X}_p^j)), \vec{\delta}_{\vec{X}_q^k}\right)$$

$$\delta_{b_q^k} \triangleq \frac{\partial E}{\partial b_q^k} = \sum_{v=1}^{V} \delta_{x_{q,v}^k}$$

where, $\vec{X}_p^j$ represents a p-th complex vector outputted by a previous layer, i.e., a j-th layer of this convolutional layer; and $\vec{X}_q^k$ represents a q-th complex vector outputted by the k-th convolutional layer; $\vec{\delta}_{x_q^k}=[\delta_{x_{q,1}^k}, \ldots, \delta_{x_{q,v}^k}, \ldots, \delta_{x_{q,V}^k}]$ represents a partial derivative or sensitivity of the loss function E to the above $\vec{X}_q^k$, represents a convolutional operation, and Fliplr(●) represents flipping the transpose of an input vector, and both p and q are positive integers greater than or equal to 1.

Figure 2:
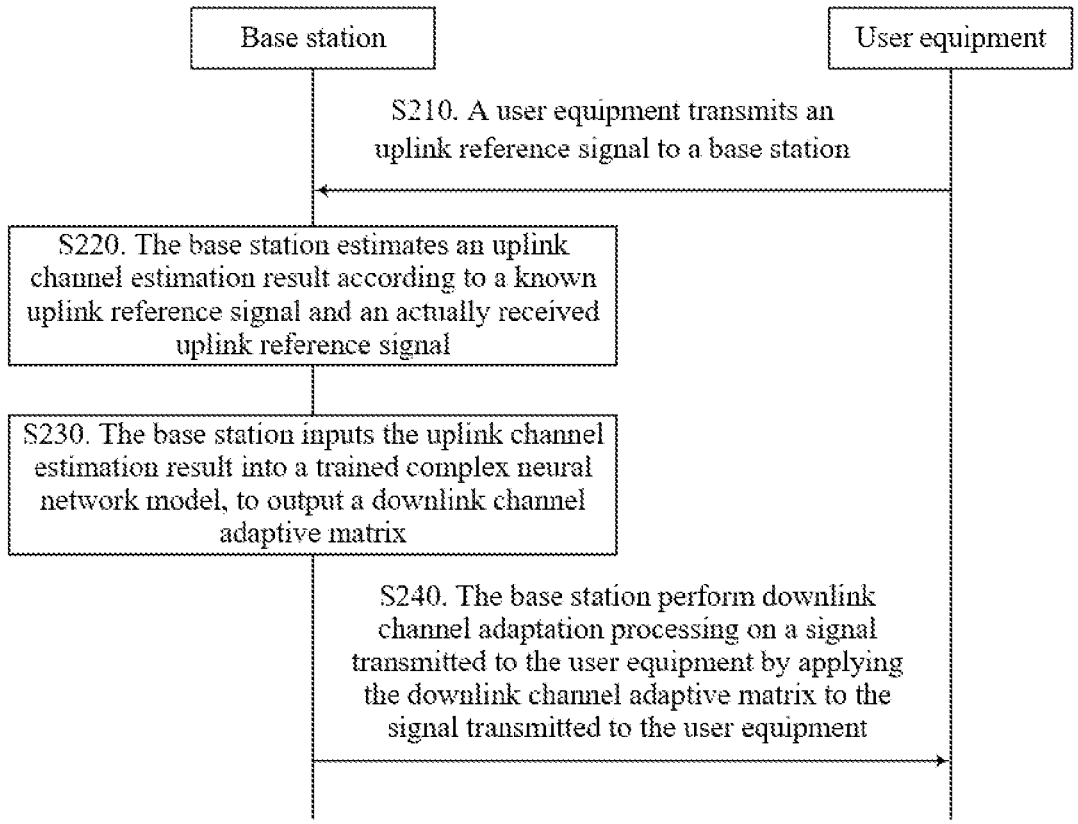
FIG. 2 is a flowchart of a reciprocal process for performing downlink channel adaptation with an uplink channel estimation result by using a complex neural network model according to an embodiment of the present application.

In an implementation, FIG. 2 is a flowchart of a reciprocity process for performing downlink channel adaptation with an uplink channel estimation result by using a complex neural network model according to an embodiment of the present application. As shown in FIG. 2, this embodiment includes: operation S210 to operation S240.

In operation S210, a user equipment transmits an uplink reference signal to a base station.

In operation S220, the base station estimates an uplink channel estimation result according to a known uplink reference signal and an actually received uplink reference signal.

In operation S230, the base station inputs the uplink channel estimation result into a trained complex neural network model, to output a downlink channel adaptive matrix.

In operation S240, the base station performs downlink channel adaptation processing on a signal transmitted to the user equipment by applying the downlink channel adaptive matrix to the signal transmitted to the user equipment.

Figure 3:
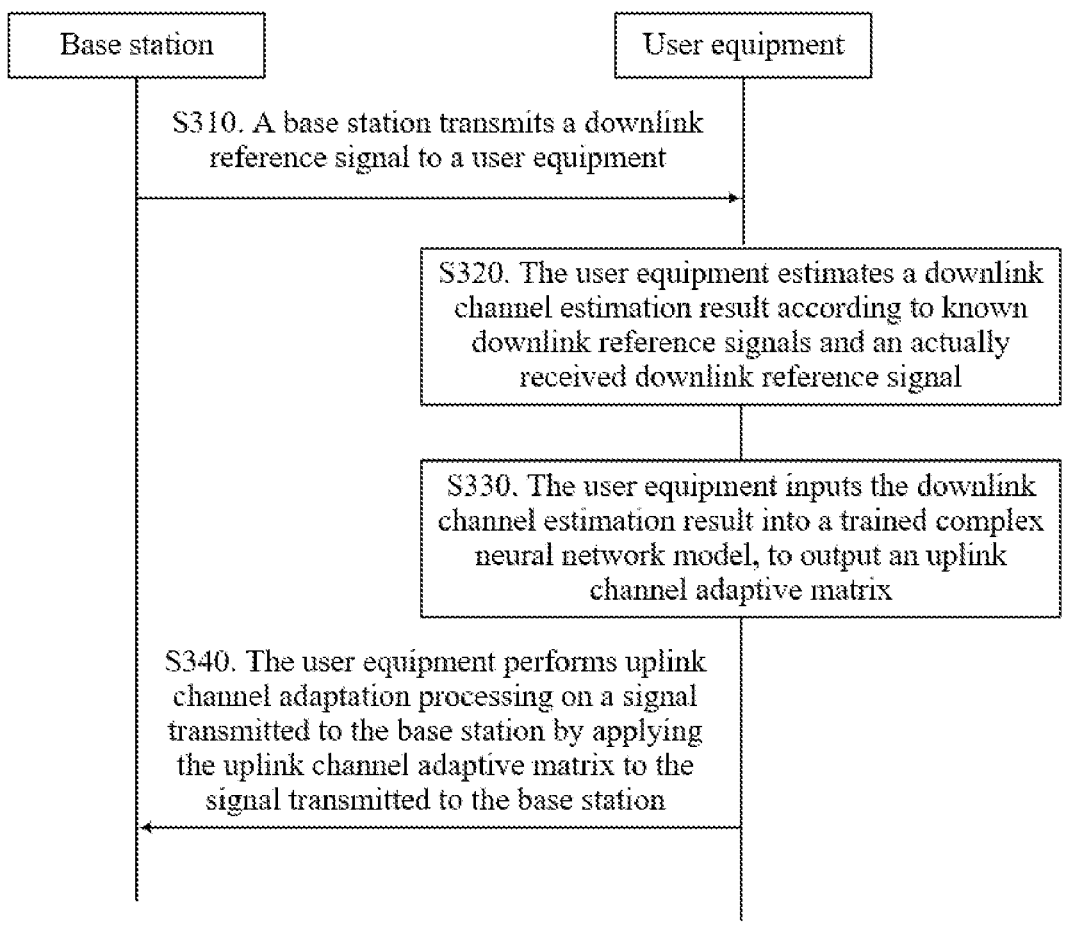
FIG. 3 is a flowchart of a reciprocal process for performing uplink channel adaptation with a downlink channel estimation result by using a complex neural network model according to an embodiment of the present application.

In an implementation, FIG. 3 is a flowchart of a reciprocity process for performing uplink channel adaptation with a downlink channel estimation result by using a complex neural network model according to an embodiment of the present application. As shown in FIG. 3, this embodiment includes: operation S310 to operation S340.

In operation S310, a base station transmits a downlink reference signal to a user equipment.

In operation S320, the user equipment estimates a downlink channel estimation result according to known downlink reference signals and an actually received downlink reference signal.

In operation S330, the user equipment inputs the downlink channel estimation result into a trained complex neural network model, to output an uplink channel adaptive matrix.

In operation S340, the user equipment performs uplink channel adaptation processing on a signal transmitted to the base station by applying the uplink channel adaptive matrix to the signal transmitted to the base station.

The base station or user equipment adopts the complex neural network model to perform uplink and downlink channel adaptive processing on signals, which ensures the real-time and accuracy of the channel state information. FIG. 4 is a schematic diagram of a result of performing uplink and downlink channel reciprocity by using a complex convolutional neural network according to an embodiment of the present application. As shown in FIG. 4, in a data set of a 30-path channel with only amplitude random, assuming that among the 12,000 samples, 4,800 fresh samples have a performance test accuracy reaching 99.15%, and 6,000 fresh samples have a performance test accuracy reaching 99.98%; in a data set of a 30-path channel with only phase random, assuming that among 12,000 samples, 3,000 fresh samples have a performance test accuracy reaching 98.43%, and 5,000 fresh samples have a performance test accuracy reaching 99.40%; and in a data set of a 30-path channel with both amplitude and random phase random, assuming that among 12,000 samples, 3,200 fresh samples have a performance test accuracy reaching 99.75%, and 4,000 fresh samples have a performance test accuracy reaching 99.69%.

In an implementation, the first communication node is taken as an execution entity, and a neural network model is taken as an example to describe the implementation process of the uplink and downlink channel reciprocity in a FDD system. In an example, the first communication node may be a base station. In an embodiment, the method for implementing the uplink and downlink channel reciprocity includes the following operation 1 to operation 3.

In operation 1, a base station side estimates an uplink channel estimation result $H_{UL}$ according to an uplink reference signal transmitted by a user equipment.

In operation 2, the base station inputs the uplink channel estimation result $H_{UL}$ into a trained neural network (NN) model, and a downlink channel adaptive matrix $H_{DL}$ is output. The input $H_{UL}$ and the output $H_{DL}$ of the neural network model may be expressed in the following relationship formular:

$$H_{DL}=NN1(H_{UL}).$$

The training for the neural network model may be performed in but not limited to the following two manners.

In a first manner, the training for the neural network model includes: dividing the wireless channel scenarios of the FDD system into N types of scenarios, acquiring by computation an uplink channel estimation result $\hat{H}_{UL}$ and downlink channel estimation result $\hat{H}_{DL}$ of each type of scenarios on the basis of training symbols known for both the base station side and the user equipment side, and composing an entry of a data set, i.e., a data pair $[\hat{H}_{UL}, \hat{H}_{DL}]$. The N types of scenarios correspond to N data sets, and each data set may have M entries. The N data sets are substituted into the neural network model for training; $\hat{H}_{UL}$ in the entries of the data set are taken as inputs of the neural network model, and $\hat{H}_{DL}$ in the entries of the data set in the entries are taken as expected outputs of the neural network model or training tags of the neural network model. A completion or termination condition of the training is that errors of outputs, generated by the neural network model for $\hat{H}_{DL}$ of all data sets as inputs, with respect to the corresponding training tags $\hat{H}_{DL}$ of the data sets respectively each can meet a specified accuracy requirement.

In a second manner, the training for the neural network model includes that: the base station side and the user equipment side perform uplink channel estimation and downlink channel estimation in real time on the basis of known training symbols, to obtain corresponding uplink channel estimation results $\hat{H}_{UL}$ and downlink channel estimation results $\hat{H}_{DL}$; where, the results $\hat{H}_{UL}$ are taken as inputs of the neural network model, and the results $\hat{H}_{DL}$ are taken as training tags of the neural network model, and the results $\hat{H}_{UL}$ and $\hat{H}_{DL}$ are substituted into the neural network model in real time for training. A completion or termination condition of the training is that errors of outputs in real time, generated by the neural network model for the real-time inputs $\hat{H}_{UL}$, with respect to the corresponding training tags $\hat{H}_{DL}$ meet a specified accuracy requirement.

In operation 3, the base station performs downlink channel adaptation processing for a downlink transmission signal by applying the downlink channel adaptive matrix $H_{DL}$ to the downlink transmission signal.

In an implementation, the second communication node is taken as an execution entity, and a neural network model is taken as an example to describe the implementation process of the uplink and downlink channel reciprocity in a FDD system. As an example, the second communication node may be a user equipment. In an embodiment, the method for implementing the uplink and downlink channel reciprocity includes the following operation 1 to operation 3.

In operation 1, a user equipment side estimates a downlink channel estimation result $H_{DL}$ according to a downlink reference signal transmitted by a base station.

In operation 2, the user equipment inputs the downlink channel estimation result $H_{DL}$ into a trained neural network (NN) model, and an uplink channel adaptive matrix $H_{UL}$ is output. The input $H_{UL}$ and the output $H_{DL}$ of the neural network model may be expressed in the following relationship formular:

$$H_{UL}=NN2(H_{DL}).$$

The training for the neural network model may be performed in but not limited to the following two manners.

In a first manner, the training for the neural network model includes: dividing the wireless channel scenarios of the FDD system into N types of scenarios, acquiring by computation an uplink channel estimation result $\hat{H}_{UL}$ and downlink channel estimation result $\hat{H}_{DL}$ of each type of scenarios on the basis of training symbols known for both the user equipment side and the base station side, and composing an entry of a data set, i.e., a data pair $[\hat{H}_{UL}, \hat{H}_{DL}]$. The N types of scenarios will correspond to N data sets, and each data set may have M entries. The N data sets are substituted into the neural network model for training; and $\hat{H}_{DL}$ in the entries of the data set are taken as inputs of the neural network model, and $\hat{H}_{UL}$ in the entries are taken as expected outputs of the neural network model or training tags of the neural network model. A completion or termination condition of the training is that errors of outputs, generated by the neural network model for $\hat{H}_{DL}$ of all data sets as inputs, with respect to the corresponding training tags $\hat{H}_{UL}$ of the data sets respectively each can meet a specified accuracy requirement.

In a second manner, the training for the neural network model includes that: the user equipment side and the base station side estimate uplink channel estimation results $\hat{H}_{UL}$ and downlink channel estimation results $\hat{H}_{DL}$ in real time on the basis of known training symbols; where, the results $\hat{H}_{DL}$ are taken as inputs of the neural network model, and the results $\hat{H}_{UL}$ are taken as training tags of the neural network model, and the results $\hat{H}_{UL}$ and $\hat{H}_{DL}$ are substituted into the neural network model in real time for training. A completion or termination condition of the training is that errors of outputs in real time, generated by the neural network model for the real-time inputs $\hat{H}_{UL}$, with respect to the corresponding training tags $\hat{H}_{UL}$ reach a specified accuracy requirement.

In operation 3, the user equipment performs uplink channel adaptation processing for an uplink transmission signal by applying the uplink channel adaptive matrix $H_{UL}$ to the uplink transmission signal.

In an implementation, the first communication node being of an execution entity and the neural network model being of a complex neural network model are taken as examples to describe the implementation process of uplink and downlink channel reciprocity in a FDD system. As an example, the first communication node may be a base station. In an embodiment, the method for implementing uplink and downlink channel reciprocity includes the following operation 1 to operation 3.

In operation 1, a base station side estimates an uplink channel estimation result $H_{UL}$ according to an uplink reference signal transmitted by a user equipment.

In operation 2, the base station inputs the uplink channel estimation result $H_{UL}$ into a trained complex neural network (complex NN) model, and a downlink channel adaptive matrix $H_{DL}$ is output, the relationship between the input and the output of the complex neural network model is as follows:

$$H_{DL} = \text{Complex}NN1(H_{UL}).$$

The complex neural network model is one kind of the neural network models. A complex number includes two parts: a real part and an imaginary part, and the imaginary part of the complex number is generally not 0 so as to distinguish the complex number from a real number. An input of the complex neural network model and an output of a complex neural network model each is a variable of a complex number, a vector of a complex number, a matric of a complex number or a tensor of a complex number. An input of a neuron activation function or any other processing function in any layer in the complex neural network model and an output of a neuron activation function or any other processing function in any layer in the complex neural network model each is a variable of a complex number, a vector of a complex number, a matric of a complex number or a tensor of a complex number. The complex neural network model is trained by using the complex error back propagation algorithm (Complex BP).

The complex error back propagation algorithm mentioned above includes but is not limited to:

a computation expression of a partial derivative or sensitivity of a loss function E to the complex weight $W_{u,v}^{j,k}$ and complex $b_v^k$ bias $b_v^k$ of the k-th full-connected layer in the complex neural network model shown as follows:

$$\delta_{W_{u,v}^{j,k}} \triangleq \frac{\partial E}{\partial W_{u,v}^{j,k}} = conj(x_u^j) \cdot conj(f'(x_u^j)) \cdot \delta_{x_v^k}$$

$$\delta_{b_v^k} \triangleq \frac{\partial E}{\partial b_v^k} = \delta_{x_v^k}$$

where, $W_{u,v}^{j,k}$ represents a complex weight of a connection from a u-th neuron of a j-th layer to a v-th neuron of the k-th layer in the complex neural network model; $b_v^k$ represents a bias of the v-th neuron of the k-th layer in the complex neural network model; and $x_u^j$ and $x_v^k$ represent a complex output signal of the u-th neuron of the j-th layer and a complex output signal of the v-th neuron in the k-th layer of the network respectively; f(●) represents a derivative of a neuron activation function to an input signal; conj(●) represents a conjugate operation on a complex number; and a computation expression of a partial derivative or sensitivity of a loss function E to a complex weight $\vec{\Lambda}_q^k$ and a complex bias $b_q^k$ of a q-th kernel of the k-th convolutional layer in the complex neural network model shown as follows:

$$\vec{\delta}_{\vec{\Lambda}_q^k} \triangleq \frac{\partial E}{\partial \vec{\Lambda}_q^k} = \sum_{p=1}^{P} Conv\left(Fliplr(conj(\vec{X}_p^j)), \vec{\delta}_{\vec{X}_q^k}\right)$$

$$\delta_{b_q^k} \triangleq \frac{\partial E}{\partial b_q^k} = \sum_{v=1}^{V} \delta_{x_{q,v}^k}$$

where, $\vec{X}_p^j$ represents a p-th complex vector outputted by a previous layer, i.e., a j-th layer of this convolutional layer; and $\vec{X}_q^k$ represents a q-th complex vector outputted by the k-th convolutional layer; $\vec{\delta}_{x_q^k} = [\delta_{x_{q,1}^k}, \ldots, \delta_{x_{q,v}^k}, \ldots, \delta_{x_{q,V}^k}]$ represents a partial derivative or sensitivity of the loss function E to the above $\vec{X}_q^k$, Conv(●) represents a convolutional operation, and Fliplr(●) represents flipping the transpose of an input vector, and both p and q are positive integers greater than or equal to 1.

The training for the neural network model may be performed in but not limited to the following two manners.

In a first manner, the training for the neural network model includes: dividing the wireless channel scenarios of the FDD system into N types of scenarios, acquiring by computation an uplink channel estimation result $\hat{H}_{UL}$ and downlink channel estimation result $\hat{H}_{DL}$ of each type of scenarios on the basis of training symbols known for both the user equipment side and the base station side, and composing an entry of a data set, i.e., a data pair $[\hat{H}_{UL}, \hat{H}_{DL}]$; the N types of scenarios will correspond to N data sets, and each data set may have M entries. The N data sets are substituted into the complex neural network model for training; and the training process includes: taking the results $\hat{H}_{UL}$ in the entries of the data set as inputs of the complex neural network model, and taking the results $\hat{H}_{DL}$ in the entries as expected outputs of the complex neural network model or training tags of the complex neural network model. A completion or termination condition of the training is that errors of outputs, generated by the complex neural network model for $\hat{H}_{UL}$ of all data sets as inputs, with respect to the corresponding training tags $\hat{H}_{DL}$ of the data sets respectively each can meet a specified accuracy requirement.

In a second manner, the training for the neural network model includes that: the user equipment side and the base station side estimate the uplink channel and the downlink channel in real time on the basis of known training symbols, to obtain corresponding uplink channel estimation results $\hat{H}_{UL}$ and downlink channel estimation results $\hat{H}_{DL}$; where, the results $\hat{H}_{UL}$ are taken as inputs of the complex neural network model, and the results $\hat{H}_{DL}$ are taken as training tags of the complex neural network model, and the results $\hat{H}_{UL}$ and $\hat{H}_{DL}$ are substituted into the complex neural network model in real time for training. A completion or termination condition of the training is that errors of outputs, generated by the complex neural network model for the real-time inputs $\hat{H}_{UL}$, with respect to the real-time obtained training tags $\hat{H}_{DL}$ reach a specified accuracy requirement.

In operation 3, the base station performs downlink channel adaptation processing for a downlink transmission signal by applying the downlink channel adaptive matrix $H_{DL}$ to the downlink transmission signal.

In an implementation, the second communication node being of an execution entity and the neural network model being of a complex neural network model are taken as examples to describe the implementation process of uplink and downlink channel reciprocity in a FDD system. As an example, the second communication node may be a user equipment. In an embodiment, the method for implementing uplink and downlink channel reciprocity includes the following operation 1 to operation 3.

In operation 1, a user equipment side estimates a downlink channel estimation result $H_{DL}$ according to a downlink reference signal transmitted by a base station.

In operation 2, the user equipment inputs the downlink channel estimation result $H_{DL}$ into a trained complex neural network model, and an uplink channel adaptive matrix $H_{UL}$ is output. The input $H_{UL}$ and the output $H_{DL}$ of the complex neural network model may be expressed in the following relationship formular:

$$H_{UL} = \text{Complex}NN2(H_{DL}).$$

The complex neural network model is one kind of the neural network models. A complex number includes two parts: a real part and an imaginary part, and the imaginary part of the complex number is generally not 0 so as to distinguish the complex number from a real number. An input of the complex neural network model and an output of a complex neural network model each is a variable of a complex number, a vector of a complex number, a matric of a complex number or a tensor of a complex number. An input of a neuron activation function or any other processing function in any layer in the complex neural network model and an output of a neuron activation function or any other processing function in any layer in the complex neural network model each is a variable of a complex number, a vector of a complex number, a matric of a complex number or a tensor of a complex number. The complex neural network model is trained by using the complex error back propagation algorithm (Complex BP).

The complex error back propagation algorithm mentioned above includes but is not limited to:

a computation expression of a partial derivative or sensitivity of a loss function E to a complex weight $W_{u,v}^{j,k}$ and a complex bias $b_v^k$ of a k-th full-connected layer in the complex neural network model shown as follows:

$$\delta_{W_{u,v}^{j,k}} \triangleq \frac{\partial E}{\partial W_{u,v}^{j,k}} = conj(x_u^j) \cdot conj(f'(x_u^j)) \cdot \delta_{x_v^k}$$

$$\delta_{b_v^k} \triangleq \frac{\partial E}{\partial b_v^k} = \delta_{x_v^k}$$

where, $W_{u,v}^{j,k}$ represents a complex weight of a connection from a u-th neuron of a j-th layer to a v-th neuron of the k-th layer in the complex neural network model; $b_v^k$ represents a bias of the v-th neuron of the k-th layer in the complex neural network model and $x_u^j$ and $x_v^k$ represent a complex output signal of the u-th neuron of the j-th layer and a complex output signal of the v-th neuron in the k-th layer of the network respectively; f'(●) represents a derivative of a neuron activation function to an input signal; conj(•) represents a conjugate operation on a complex number; and a computation expression of a partial derivative or sensitivity of a loss function E to a complex weight $\vec{\Lambda}_q^k$ and a complex bias $b_q^k$ of a q-th kernel of the k-th convolutional layer in the complex neural network model shown as follows:

$$\vec{\delta}_{\vec{\Lambda}_q^k} \triangleq \frac{\partial E}{\partial \vec{\Lambda}_q^k} = \sum_{p=1}^{P} Conv\left(Fliplr(conj(\vec{X}_p^j)), \vec{\delta}_{\vec{X}_q^k}\right)$$

$$\delta_{b_q^k} \triangleq \frac{\partial E}{\partial b_q^k} = \sum_{v=1}^{V} \delta_{x_{q,v}^k}$$

where, $\vec{X}_p^j$ represents a p-th complex vector outputted by a previous layer, i.e., a j-th layer of this convolutional layer; and $\vec{X}_q^k$ represents a q-th complex vector outputted by the k-th layer of the convolutional layer; $\vec{\delta}_{X_q^k} = [\delta_{x_{q,1}^k}, \ldots, \delta_{x_{q,v}^k}, \ldots, \delta_{x_{q,V}^k}]$ represents a partial derivative or sensitivity of the loss function E to the above $\vec{X}_q^k$, Conv(●) represents a convolutional operation, and Fliplr(●) represents flipping the transpose of an input vector, and both p and q are positive integers greater than or equal to 1.

The training for the complex neural network model may be performed in but not limited to the following two manners.

In a first manner, the training for the complex neural network model includes: dividing the wireless channel scenarios of the FDD system into N types of scenarios, acquiring by computation an uplink channel estimation result $\hat{H}_{UL}$ and downlink channel estimation result $\hat{H}_{DL}$ of each type of scenarios on the basis of training symbols known for both the user equipment side and the base station side, and composing an entry of a data set, i.e., a data pair [$\hat{H}_{UL}$, $\hat{H}_{DL}$]; the N types of scenarios will correspond to N data sets, and each data set may have M entries. The N data sets are substituted into the complex neural network model for training; and the training process includes: taking the results $\hat{H}_{DL}$ in the entries of the data set as inputs of the complex neural network model, and taking the results $\hat{H}_{UL}$ in the entries as expected outputs of the complex neural network model or training tags of the complex neural network model. A completion or termination condition of the training is that errors of outputs, generated by the complex neural network model for $\hat{H}_{DL}$ of all data sets as inputs, with respect to the corresponding training tags $\hat{H}_{UL}$ of the data sets respectively each can meet a specified accuracy requirement.

In a second manner, the training for the complex neural network model includes that: the user equipment side and the base station side estimate the uplink channel and the downlink channel in real time on the basis of known training symbols, to obtain uplink channel estimation results $\hat{H}_{UL}$ and downlink channel estimation results $\hat{H}_{DL}$; where, the results $\hat{H}_{DL}$ are taken as inputs of the complex neural network, and the results $\hat{H}_{UL}$ are taken as training tags of the complex neural network, and the results $\hat{H}_{UL}$ and $\hat{H}_{DL}$ are substituted into the complex neural network in real time for training. A completion or termination condition of the training is that the errors of outputs, generated by the complex neural network for the real-time inputs $\hat{H}_{DL}$, with respect to the real-time obtained training tags $\hat{H}_{UL}$ reach a specified error accuracy requirement.

In operation 3, the user equipment performs uplink channel adaptation processing for an uplink transmission signal by applying the uplink channel adaptive matrix $H_{UL}$ to the uplink transmission signal.

In an implementation, the first communication node being of an execution entity and the neural network model being of a complex convolutional neural network model are taken as examples to describe the implementation process of uplink and downlink channel reciprocity in a FDD system. As an example, the first communication node may be a base station. In an embodiment, the method for implementing uplink and downlink channel reciprocity includes the following operation 1 to operation 3.

In operation 1, a base station estimates an uplink channel estimation result $H_{UL}$ according to a detection reference signal transmitted by a user equipment.

In operation 2, the base station inputs the uplink channel estimation result $H_{UL}$ into a trained complex convolutional neural network (complex CNN) model, and a downlink channel adaptive matrix $H_{DL}$ is output. The input $H_{UL}$ and the output $H_{DL}$ of the complex convolutional neural network model may be expressed in the following relationship formular:

$$H_{DL} = \text{Complex}CNN1(H_{UL}).$$

The complex convolutional neural network model is one kind of the neural network models. A complex number includes two parts: a real part and an imaginary part, and the imaginary part of the complex number is generally not 0 so as to distinguish the complex number from a real number. An input of a complex convolutional neural network model and an output of a complex convolutional neural network model each is a variable of a complex number, a vector of a complex number, a matric of a complex number or a tensor of a complex number. An input of a neuron activation function or any other processing function in any layer in the complex convolutional neural network model and an output of a neuron activation function or any other processing function in any layer in the complex convolutional neural network model each is a variable of a complex number, a vector of a complex number, a matric of a complex number or a tensor of a complex number. The complex convolutional neural network model is trained by using the complex error back propagation algorithm (Complex BP).

The complex error back propagation algorithm mentioned above includes but is not limited to:

a computation expression of a partial derivative or sensitivity of a loss function E to a complex weight $W_{u,v}^{j,k}$ and a complex bias $b_v^k$ of a k-th full-connected layer in the complex neural network model shown as follows:

$$\delta_{W_{u,v}^{j,k}} \triangleq \frac{\partial E}{\partial W_{u,v}^{j,k}} = conj(x_u^j) \cdot conj(f'(x_u^j)) \cdot \delta_{x_v^k}$$

$$\delta_{b_v^k} \triangleq \frac{\partial E}{\partial b_v^k} = \delta_{x_v^k}$$

where, $W_{u,v}^{j,k}$ represents a complex weight of a connection from a u-th neuron of a j-th layer to a v-neuron of the k-th layer in the complex neural network model; $b_v^k$ represents a bias of the v-th neuron of the k-th layer in the complex neural network model and $x_u^j$ and $x_v^k$ represent a complex output signal of the u-th neuron of the j-th layer and a complex output signal of the v-th neuron in the k-th layer of the network respectively; f'(●) represents a derivative of a neuron activation function to an input signal; conj(•) represents a conjugate operation on a complex number; and a computation expression of a partial derivative or sensitivity of a loss function E to a complex weight $\vec{\Lambda}_q^k$ and a complex bias $b_q^k$ of a q-th kernel of the k-th convolutional layer in the complex neural network model shown as follows:

$$\vec{\delta}_{\vec{\Lambda}_q^k} \triangleq \frac{\partial E}{\partial \vec{\Lambda}_q^k} = \sum_{p=1}^{P} Conv\left(Fliplr\left(conj(\vec{X}_p^j)\right), \vec{\delta}_{\vec{X}_q^k}\right)$$

$$\delta_{b_q^k} \triangleq \frac{\partial E}{\partial b_q^k} = \sum_{v=1}^{V} \delta_{x_{q,v}^k}$$

where, $\vec{X}_p^j$ represents a p-th complex vector outputted by a previous layer, i.e., a j-th layer of this convolutional layer; and $\vec{X}_q^k$ represents a q-th complex vector outputted by the k-th layer of the convolutional layer; $\vec{\delta}_{x_q^k} = [\delta_{x_{q,1}^k}, \ldots, \delta_{x_{q,v}^k}]$ represents a partial derivative or sensitivity of the loss function E to the above $\vec{X}_q^k$, Conv(●) represents a convolutional operation, and Fliplr(●) represents flipping the transpose of an input vector, and both p and q are positive integers greater than or equal to 1.

The training for the complex convolutional neural network model may be performed in but not limited to the following two manners.

In a first manner, the training for the complex convolutional neural network model includes: dividing the wireless channel scenarios of the FDD system into N types of scenarios, acquiring by computation an uplink channel estimation result $\hat{H}_{UL}$ and downlink channel estimation result $\hat{H}_{DL}$ of each type of scenarios on the basis of training symbols known for both the user equipment side and the base station side, and composing an entry of a data set, i.e., a data pair $[\hat{H}_{UL}, \hat{H}_{DL}]$; the N types of scenarios will correspond to N data sets, and each data set may have M entries. The N data sets are substituted into the complex convolutional neural network model for training; and the training process includes: taking the results $\hat{H}_{UL}$ in the entries of the data set as inputs of the complex convolutional neural network model, and taking the results $\hat{H}_{DL}$ in the entries as expected outputs of the complex convolutional neural network model or training tags of the complex convolutional neural network model. A completion or termination condition of the training is that errors of outputs, generated by the complex convolutional neural network model for $\hat{H}_{UL}$ of all data sets as inputs, with respect to the corresponding training tags $\hat{H}_{DL}$ of the data sets respectively each can meet a specified accuracy requirement.

In a second manner, the training for the complex convolutional neural network model includes that: the user equipment side and the base station side estimate the uplink channel and the downlink channel in real time on the basis of known training symbols, to obtain corresponding uplink channel estimation results $\hat{H}_{UL}$ and downlink channel estimation results $\hat{H}_{DL}$; where, the results $\hat{H}_{UL}$ are taken as inputs of the complex convolutional neural network model, and the results $\hat{H}_{DL}$ are taken as training tags of the complex convolutional neural network model, and the results $\hat{H}_{UL}$ and $\hat{H}_{DL}$ are substituted into the complex convolutional neural network model in real time for training. A completion or termination condition of the training is that errors of outputs, generated by the complex convolutional neural network model for the real-time inputs $\hat{H}_{UL}$, with respect to the real-time obtained training tags $\hat{H}_{DL}$ reach a specified accuracy requirement.

In operation 3, the base station performs downlink channel adaptation processing for a downlink transmission signal by applying the downlink channel adaptive matrix $H_{DL}$ to the downlink transmission signal.

In an implementation, the second communication node is taken as an execution entity, and the neural network model being of a complex convolutional neural network model is taken as an example to describe the implementation process of uplink and downlink channel reciprocity in a FDD system. As an example, the second communication node may be a user equipment. In an embodiment, the method for implementing uplink and downlink channel reciprocity includes the following operation 1 to operation 3.

In operation 1, a user equipment side estimates a downlink channel estimation result $H_{DL}$ according to a downlink reference signal transmitted by a base station.

In operation 2, the user equipment inputs the downlink channel estimation result $H_{DL}$ into a trained complex convolutional neural network model, and an uplink channel adaptive matrix $H_{UL}$ is output. The input $H_{UL}$ and the output $H_{DL}$ of the complex convolutional neural network model may be expressed in the following relationship formular:

$$H_{UL} = \text{Complex}CNN2(H_{DL}).$$

The complex convolutional neural network model is one kind of the neural network models. A complex number includes two parts: a real part and an imaginary part, and the imaginary part of the complex number is generally not 0 so as to distinguish the complex number from a real number. An input of a complex convolutional neural network model and an output of a complex convolutional neural network model each is a variable of a complex number, a vector of a complex number, a matric of a complex number or a tensor of a complex number. An input of a neuron activation function or any other processing function in any layer in the complex convolutional neural network model and an output of a neuron activation function or any other processing function in any layer in the complex convolutional neural network model each is a variable of a complex number, a vector of a complex number, a matric of a complex number or a tensor of a complex number. The complex convolutional neural network model is trained by using the complex error back propagation algorithm (Complex BP).

The complex error back propagation algorithm mentioned above includes but is not limited to:
a computation expression of a partial derivative or sensitivity of a loss function E to a complex $W_{u,v}^{j,k}$ and a complex bias $b_v^k$ of a k-th full-connected layer in the complex convolutional neural network model shown as follows:

$$\delta_{W_{u,v}^{j,k}} \triangleq \frac{\partial E}{\partial W_{u,v}^{j,k}} = conj(x_u^j) \cdot conj(f'(x_u^j)) \cdot \delta_{x_v^k}$$

$$\delta_{b_v^k} \triangleq \frac{\partial E}{\partial b_v^k} = \delta_{x_v^k}$$

where, $W_{u,v}^{j,k}$ represents a complex weight of a connection from a u-th neuron of a j-th layer to a v-th neuron of the k-th layer in the complex neural network model; $b_v^k$ represents a bias of the v-th neuron of the k-th layer in the complex neural network model and $x_u^j$ and $x_v^k$ represent a complex output signal of the u-th neuron in the j-th layer and a complex output signal of the v-th neuron in the k-th layer of the network respectively; represents a derivative of a neuron activation function to an input signal; conj(•) represents a conjugate operation on a complex number; and a computation expression of a partial derivative or sensitivity of a loss function E to a complex weight $\Lambda_q^k$ and a complex bias $b_q^k$ of a q-th kernel in the k-th convolutional layer in the complex neural network model shown as follows:

$$\vec{\delta}_{\vec{\Lambda}_q^k} \triangleq \frac{\partial E}{\partial \vec{\Lambda}_q^k} = \sum_{p=1}^{P} Conv\left(Fliplr\left(conj(\vec{X}_p^j)\right), \vec{\delta}_{\vec{X}_q^k}\right)$$

$$\delta_{b_q^k} \triangleq \frac{\partial E}{\partial b_q^k} = \sum_{v=1}^{V} \delta_{x_{q,v}^k}$$

where, $\vec{X}_p^j$ represents a p-th complex vector outputted by a previous layer, i.e., a j-th layer of this convolutional layer; and $\vec{X}_q^k$ represents a q-th complex vector outputted by the k-th layer of the convolutional layer; $\vec{\delta}_{x_q^k} = [\delta_{x_{q,1}^k}, \ldots, \delta_{x_{q,v}^k}]$ represents a partial derivative or sensitivity of the loss function E to the above $\vec{X}_q^k$, Conv(●) represents a convolutional operation, and Fliplr(●) represents flipping the transpose of an input vector, and both p and q are positive integers greater than or equal to 1.

The training for the complex convolutional neural network model may be performed in but not limited to the following two manners.

In a first manner, the training for the complex convolutional neural network model includes: dividing wireless channel scenarios of the FDD system into N types of scenarios, acquiring computation an uplink channel estimation result $\hat{H}_{UL}$ and downlink channel estimation result $\hat{H}_{DL}$ of each type of scenarios on the basis of training symbols known for both the user equipment side and the base station side, and composing an entry of a data set, i.e., a data pair $[\hat{H}_{UL}, \hat{H}_{DL}]$; the N types of scenarios will correspond to N data sets, and each data set may have M entries. The N data sets are substituted into the complex convolutional neural network model for training; and the training process includes: taking the results $\hat{H}_{DL}$ in the entries of the data set as inputs of the complex convolutional neural network, and taking the results $\hat{H}_{UL}$ in the entries as expected outputs of the complex convolutional neural network model or training tags of the complex convolutional neural network model. A completion or termination condition of the training is that errors of outputs, generated by the complex convolutional neural network model for $\hat{H}_{DL}$ of all data sets as inputs, with respect to the corresponding training tags $\hat{H}_{UL}$ of the data sets respectively each can meet a specified accuracy requirement.

In a second manner, the training for the complex convolutional neural network model includes that: the user equipment side and the base station side estimate the uplink channel and the downlink channel in real time on the basis of known training symbols, to obtain uplink channel estimation results $\hat{H}_{UL}$ and downlink channel estimation results $\hat{H}_{DL}$; where, the results $\hat{H}_{DL}$ are taken as inputs of the complex convolutional neural network, and the results $\hat{H}_{UL}$ are taken as training tags, and the $\hat{H}_{UL}$ and $\hat{H}_{DL}$ are substituted into the complex convolutional neural network model in real time for training. A completion or termination condition of the training is that errors of outputs, generated by the complex convolutional neural network model for the real-time inputs $\hat{H}_{DL}$, with respect to the real-time obtained training tags $\hat{H}_{UL}$ reach a specified error accuracy requirement.

In operation 3, the user equipment performs uplink channel adaptation processing for an uplink transmission signal by applying the uplink channel adaptive matrix $H_{UL}$ to the uplink transmission signal.

In an implementation, the first communication node is taken as an execution entity, and the network model being of a complex residual network model is taken as an example to describe the implementation process of uplink and downlink channel reciprocity in a FDD system. As an example, the first communication node may be a base station. In an embodiment, the method for implementing uplink and downlink channel reciprocity includes the following operation 1 to operation 3.

In operation 1, a base station estimates an uplink channel estimation result $H_{UL}$ according to a detection reference signal transmitted by a user equipment.

In operation 2, the base station inputs the uplink channel estimation result $H_{UL}$ into a trained complex residual network (Complex ResNet) model, and a downlink channel adaptive matrix $H_{DL}$ is output. The input $H_{UL}$ and the output $H_{DL}$ of the complex residual network model may be expressed in the following relationship formular:

$$H_{DL}=\text{ComplexResNet1}(H_{UL}).$$

The complex residual network model is one kind of the complex convolutional neural network models. An input of a complex residual network model and an output of a complex residual network model each is a variable of a complex number, a vector of a complex number, a matric of a complex number or a tensor of a complex number. An input of a neuron activation function or any other processing function in any layer in the complex residual network model and an output of a neuron activation function or any other processing function in any layer in the complex residual network model each is a variable of a complex number, a vector of a complex number, a matric of a complex number or a tensor of a complex number. The complex residual network model is trained by using the complex error back propagation algorithm (Complex BP).

The complex error back propagation algorithm mentioned above includes but is not limited to:

a computation expression of a partial derivative or sensitivity of a loss function E to a complex weight $W_{u,v}^{j,k}$ and a complex bias $b_v^k$ of a k-th full-connected layer in the complex residual network model shown as follows:

$$\delta_{W_{u,v}^{j,k}} \triangleq \frac{\partial E}{\partial W_{u,v}^{j,k}} = conj(x_u^j) \cdot conj(f'(x_u^j)) \cdot \delta_{x_v^k}$$

$$\delta_{b_v^k} \triangleq \frac{\partial E}{\partial b_v^k} = \delta_{x_v^k}$$

where $W_{u,v}^{j,k}$ represents a complex weight of a connection from a u-th neuron of a j-th layer to a v-th neuron of the k-th layer in the complex neural network model; $b_v^k$ represents a bias of the v-th neuron of the k-th layer in the complex neural network model and $x_u^j$ and $x_v^k$ represent a complex output signal of the u-th neuron in the j-th layer and a complex output signal of the v-th neuron in the k-th layer of the network respectively; f'(●) represents a derivative of a neuron activation function to an input signal; conj(•) represents a conjugate operation on a complex number; and a computation expression of a partial derivative or sensitivity of a loss function E to a complex weight $\vec{\Lambda}_q^k$ and a complex bias $b_q^k$ of a q-th kernel in the k-th convolutional layer in the complex residual network model shown as follows:

$$\vec{\delta}_{\vec{\Lambda}_q^k} \triangleq \frac{\partial E}{\partial \vec{\Lambda}_q^k} = \sum_{p=1}^{P} Conv\left(Fliplr(conj(\vec{X}_p^j)), \vec{\delta}_{\vec{X}_q^k}\right)$$

$$\delta_{b_q^k} \triangleq \frac{\partial E}{\partial b_q^k} = \sum_{v=1}^{V} \delta_{x_{q,v}^k}$$

where, $\vec{X}_p^j$ represents a p-th complex vector outputted by a previous layer, i.e., a j-th layer of this convolutional layer; $\vec{X}_q^k$ and represents a q-th complex vector outputted by the k-th layer of the convolutional layer; $\vec{\delta}_{x_q^k}=[\delta_{x_{q,l}^k}, \ldots, \delta_{x_{q,v}^k}, \ldots, \delta_{x_{q,V}^k}]$ represents a partial derivative or sensitivity of the loss function E to the above $\vec{X}_q^k$, Conv(●) represents a convolutional operation, and Fliplr(●) represents flipping the transpose of an input vector, and both p and q are positive integers greater than or equal to 1.

The training for the complex residual network model may be performed in but not limited to the following two manners.

In a first manner, the training for the complex residual network model includes: dividing the wireless channel scenarios of the FDD system into N types of scenarios, acquiring by computation an uplink channel estimation result $\hat{H}_{UL}$ and downlink channel estimation result $\hat{H}_{DL}$ of each type of scenarios on the basis of training symbols known for both the user equipment side and the base station side, and composing an entry of a data set, i.e., a data pair [$\hat{H}_{UL}$, $\hat{H}_{DL}$]; the N types of scenarios will correspond to N data sets, and each data set may have M entries. The N data sets are substituted into the complex residual network model for training; and the training process includes: taking the results $\hat{H}_{UL}$ in the entries of the data set as inputs of the complex residual network model, and taking the results $\hat{H}_{DL}$ in the entries as expected outputs of the complex residual network model or training tags of the complex residual network model. A completion or termination condition of the training is that errors of outputs, generated by the complex residual network model for $\hat{H}_{UL}$ of all data sets as inputs, with respect to the corresponding training tags $\hat{H}_{DL}$ of the data sets respectively each can meet a specified accuracy requirement.

In a second manner, the training for the complex residual network model includes that: the user equipment side and the base station side estimate the uplink channel and the downlink channel in real time on the basis of known training symbols, to obtain corresponding uplink channel estimation results $\hat{H}_{UL}$ and downlink channel estimation results $\hat{H}_{DL}$; where, the results $\hat{H}_{UL}$ are taken as inputs of the complex residual network model, and the results $\hat{H}_{DL}$ are taken as training tags of the complex residual network model, and the results $\hat{H}_{UL}$ and $\hat{H}_{DL}$ are substituted into the complex residual network model in real time for training. A completion or termination condition of the training is that errors of outputs, generated by the complex residual network for the real-time inputs $\hat{H}_{UL}$, with respect to the real-time obtained training tags $\hat{H}_{DL}$ reach a specified accuracy requirement.

In operation 3, the base station performs downlink channel adaptation processing for a downlink transmission signal by applying the downlink channel adaptive matrix $H_{DL}$ to the downlink transmission signal.

In an implementation, the second communication node is taken as an execution entity, and the neural network model being of a complex residual network model is taken as an example to describe the implementation process of uplink and downlink channel reciprocity in a FDD system. As an example, the second communication node may be a user equipment. In an embodiment, the method for implementing uplink and downlink channel reciprocity includes the following operation 1 to operation 3.

In operation 1, a user equipment estimates a downlink channel estimation result $H_{DL}$ according to a downlink reference signal transmitted by a base station.

In operation 2, the user equipment inputs the downlink channel estimation result $H_{DL}$ into a trained complex residual network model, and an uplink channel adaptive matrix $H_{UL}$ is output. The input $H_{UL}$ and the output $H_{DL}$ of the complex residual network model may be expressed in the following relationship formular:

$$H_{UL} = \text{ComplexResNet2}(H_{DL}).$$

The complex residual network model is one kind of the complex neural network models. An input of a complex residual network model and an output of a complex residual network model each is a variable of a complex number, a vector of a complex number, a matric of a complex number or a tensor of a complex number. An input of a neuron activation function or any other processing function in any layer in the complex residual network model and an output of a neuron activation function or any other processing function in any layer in the complex residual network model each is a variable of a complex number, a vector of a complex number, a matric of a complex number or a tensor of a complex number. The complex residual network model is trained by using the complex error back propagation algorithm (Complex BP).

The complex error back propagation algorithm mentioned above includes but is not limited to:

a computation expression of a partial derivative or sensitivity of a loss function E to a complex weight $W_{u,v}^{j,k}$ and a complex bias $b_v^k$ of a k-th full-connected layer in the complex residual network model shown as follows:

$$\delta_{W_{u,v}^{j,k}} \triangleq \frac{\partial E}{\partial W_{u,v}^{j,k}} = conj(x_u^j) \cdot conj(f'(x_u^j)) \cdot \delta_{x_v^k}$$

$$\delta_{b_v^k} \triangleq \frac{\partial E}{\partial b_v^k} = \delta_{x_v^k}$$

where, $W_{u,v}^{j,k}$ represents a complex weight of a connection from a u-th neuron of a j-th layer to a v-th neuron of the k-th layer in the complex neural network model; $b_v^k$ represents a bias of the v-th neuron of the k-th layer in the complex neural network model and $x_u^j$ and $x_v^k$ represent a complex output signal of the u-th neuron in the j-th layer and a complex output signal of the v-th neuron in the k-th layer of the network respectively; f'(●) represents a derivative of a neuron activation function to an input signal; conj(●) represents a conjugate operation on a complex number; and a computation expression of a partial derivative or sensitivity of a loss function E to a complex weight $\vec{\Lambda}_q^k$ and a complex bias $b_q^k$ of a q-th kernel in the k-th convolutional layer in the complex residual network model shown as follows:

$$\delta_{\vec{\Lambda}_q^k} \triangleq \frac{\partial E}{\partial \vec{\Lambda}_q^k} = \sum_{p=1}^{P} Conv\left(Fliplr(conj(\vec{X}_p^j)), \delta_{\vec{X}_q^k}\right)$$

$$\delta_{b_q^k} \triangleq \frac{\partial E}{\partial b_q^k} = \sum_{v=1}^{V} \delta_{x_{q,v}^k}$$

where, $\vec{X}_p^j$ represents a p-th complex vector outputted by a previous layer, i.e., a j-th layer of this convolutional layer; and $\vec{X}_q^k$ represents a q-th complex vector outputted by the k-th layer of the convolutional layer; $\vec{\delta}_{x_q^k} = [\delta_{x_{q,1}^k}, \ldots, \delta_{x_{q,v}^k}, \ldots, \delta_{x_{q,V}^k}]$ represents a partial derivative or sensitivity of the loss function E to the above $\vec{X}_q^k$, Conv(●) represents a convolutional operation, and Fliplr(●) represents flipping the transpose of an input vector, and both p and q are positive integers greater than or equal to 1.

The training of the complex residual network model may be performed in but not limited to the following two manners In a first manner, the training for the complex residual network model includes: dividing the wireless channel scenarios of the FDD system into N types of scenarios, acquiring by computation an uplink channel estimation result $\hat{H}_{UL}$ and downlink channel estimation result $\hat{H}_{DL}$ of each type of scenarios on the basis of training symbols known for both the user equipment side and the base station side, and composing an entry of a data set, i.e., a data pair $[\hat{H}_{UL}, \hat{H}_{DL}]$; the N types of scenarios will correspond to N data sets, and each data set may have M entries. The N data sets are substituted into the complex residual network model for training; and the training process includes: taking the results $\hat{H}_{DL}$ in the entries of the data set as inputs of the complex residual network, and taking the results $\hat{H}_{UL}$ in the entries as expected outputs of the complex residual network or training tags of the complex residual network. A completion or termination condition of the training is that errors of outputs, generated by the complex residual network model for $\hat{H}_{DL}$ of all data sets as inputs, with respect to the corresponding training tags $\hat{H}_{UL}$ of the data sets respectively each can meet a specified accuracy requirement.

In a second manner, the training for the complex residual network model includes that: the user equipment side and the base station side estimate the uplink channel and the downlink channel in real time on the basis of known training symbols, to obtain uplink channel estimation results $\hat{H}_{UL}$ and downlink channel estimation results $\hat{H}_{DL}$; where, the results $\hat{H}_{DL}$ are taken as inputs of the complex residual network model, and the results $\hat{H}_{UL}$ are taken as training tags of the complex residual network model, and the results $\hat{H}_{UL}$ and $\hat{H}_{DL}$ are substituted into the complex residual network in real time for training. A completion or termination condition of the training is that errors of outputs, generated by the complex residual network model for the real-time inputs $\hat{H}_{DL}$, with respect to the real-time obtained training tags $\hat{H}_{UL}$ reach a specified error accuracy requirement.

In operation 3, the user equipment performs uplink channel adaptation processing for an uplink transmission signal by applying the uplink channel adaptive matrix $H_{UL}$ to the uplink transmission signal.

FIG. 5 is a structural block diagram of an apparatus for implementing uplink and downlink channel reciprocity according to an embodiment of the present application. As shown in FIG. 5, this embodiment includes: an estimator 410, an input device 420 and an application processor 430.

The estimator 410 is configured to perform channel estimation in real time according to a received reference signal to obtain a channel estimation result; the input device 420 is configured to input the channel estimation result to a pre-trained neural network model, to output a channel adaptive matrix; the application processor 430 is configure to perform channel adaptation processing for a transmission signal by apply the channel adaptive matrix to the transmission signal.

The apparatus for implementing uplink and downlink channel reciprocity according to this embodiment is configured to implement the method for implementing uplink and downlink channel reciprocity in the embodiment shown in FIG. 1. The implementation principle and technical effect of the apparatus for implementing uplink and downlink channel reciprocity according to this embodiment are similar to those of the method for implementing uplink and downlink channel reciprocity, and will not be repeatedly described herein.

In an embodiment, in a case where the communication node is a first communication node, the reference signal is an uplink reference signal; the channel estimation is an uplink channel estimation; and the channel estimation result is an uplink channel estimation result; the channel adaptive matrix is a downlink channel adaptive matrix; and the channel adaptive processing is a downlink channel adaptive processing.

In an embodiment, in a case where the communication node is a second communication node, the reference signal is a downlink reference signal; the channel estimation is a downlink channel estimation; the channel estimation result is a downlink channel estimation result; the channel adaptive matrix is an uplink channel adaptation matrix; and the channel adaptive processing is an uplink channel adaptive processing.

In an embodiment, the neural network model includes: a complex neural network model; the complex neural network model includes a complex convolutional neural network model; and the complex convolutional neural network includes a complex residual neural network model.

In an embodiment, the training process for the neural network model includes:

dividing wireless channel scenarios of a frequency division duplexing (FDD) system where the communication node is located into N types of scenarios, where N is a positive integer greater than or equal to 1; performing uplink channel estimation and downlink channel estimation for each type of scenarios according to known training symbols to obtain uplink channel estimation results and first downlink channel estimation results; and sequentially inputting an uplink channel estimation result of each entry of entries in a data set corresponding to the each type of scenarios into the neural network model to output a respective second downlink channel estimation result, until an error of the respective second downlink channel estimation result with respect to a first downlink channel estimation result served as a training tag meets a preset accuracy, where the entries are data pairs each composed of a uplink channel estimation result of the uplink channel estimation results and a respective first downlink channel estimation result of the first downlink channel estimation results.

In an embodiment, the training process for the neural network model includes: performing uplink channel estimation and downlink channel estimation in real time according to known training symbols, to obtain uplink channel estimation results and first downlink channel estimation results; and sequentially inputting each uplink channel estimation result of uplink channel estimation results into the neural network model, and outputting a respective second downlink channel estimation result, until an error of the respective second downlink channel estimation result with respect to a first downlink channel estimation result served as a training tag meets a preset accuracy.

In an embodiment, in a case where the neural network model is a complex neural network model, a complex convolutional neural network model or a complex residual network model, the neural network model is trained by using a complex error back propagation algorithm.

In an embodiment, the complex error back propagation algorithm includes:

a computation expression of a partial derivative or sensitivity of a loss function E to a complex weight $W_{u,v}^{j,k}$ and a complex bias $b_v^k$ of a k-th full-connected layer in the complex neural network model shown as follows:

$$\delta_{W_{u,v}^{j,k}} \triangleq \frac{\partial E}{\partial W_{u,v}^{j,k}} = conj(x_u^j) \cdot conj(f'(x_u^j)) \cdot \delta_{x_v^k}$$

$$\delta_{b_v^k} \triangleq \frac{\partial E}{\partial b_v^k} = \delta_{x_v^k}$$

where, $W_{u,v}^{j,k}$ represents a complex weight of a connection from a u-th neuron of a j-th layer to a v-th neuron of the k-th layer in the complex neural network model; $b_v^k$ represents a bias of the v-th neuron of the k-th layer in the complex neural network model and $x_u^j$ and $x_v^k$, represent a complex output signal of the u-th neuron of the j-th layer and a complex output signal of the v-th neuron in the k-th layer in the network respectively; f'(●) represents a derivative of a neuron activation function to an input signal; conj(●) represents a conjugate operation on a complex number.

In an embodiment, the complex error back propagation algorithm includes:

a computation expression of a partial derivative or sensitivity of a loss function E to a complex weight $\vec{\Lambda}_q^k$ and a complex bias $b_q^k$ of a q-th kernel of the k-th convolutional layer in the complex neural network model shown as follows:

$$\delta_{\vec{\Lambda}_q^k} \triangleq \frac{\partial E}{\partial \vec{\Lambda}_q^k} = \sum_{p=1}^{P} Conv\left(Fliplr(conj(\vec{X}_p^j)), \vec{\delta}_{\vec{X}_q^k}\right)$$

$$\delta_{b_q^k} \triangleq \frac{\partial E}{\partial b_q^k} = \sum_{v=1}^{V} \delta_{x_{q,v}^k}$$

where, $\vec{X}_p^j$ represents a p-th complex vector outputted by a previous layer, i.e., a j-th layer of this convolutional layer; and $\vec{X}_q^k$ represents a q-th complex vector outputted by the k-th layer of the convolutional layer; $\vec{\delta}x_q^k=[\delta_{x_{q,1}^k}, \ldots, \delta_{x_{q,i}^k}, \ldots, \delta_{x_{q,V}^k}]$ represents a partial derivative or sensitivity of the loss function E to the above $\vec{X}_q^k$, Conv(●) represents a convolutional operation, and Fliplr(●) represents flipping the transpose of an input vector, and both p and q are positive integers greater than or equal to 1.

Figure 6:
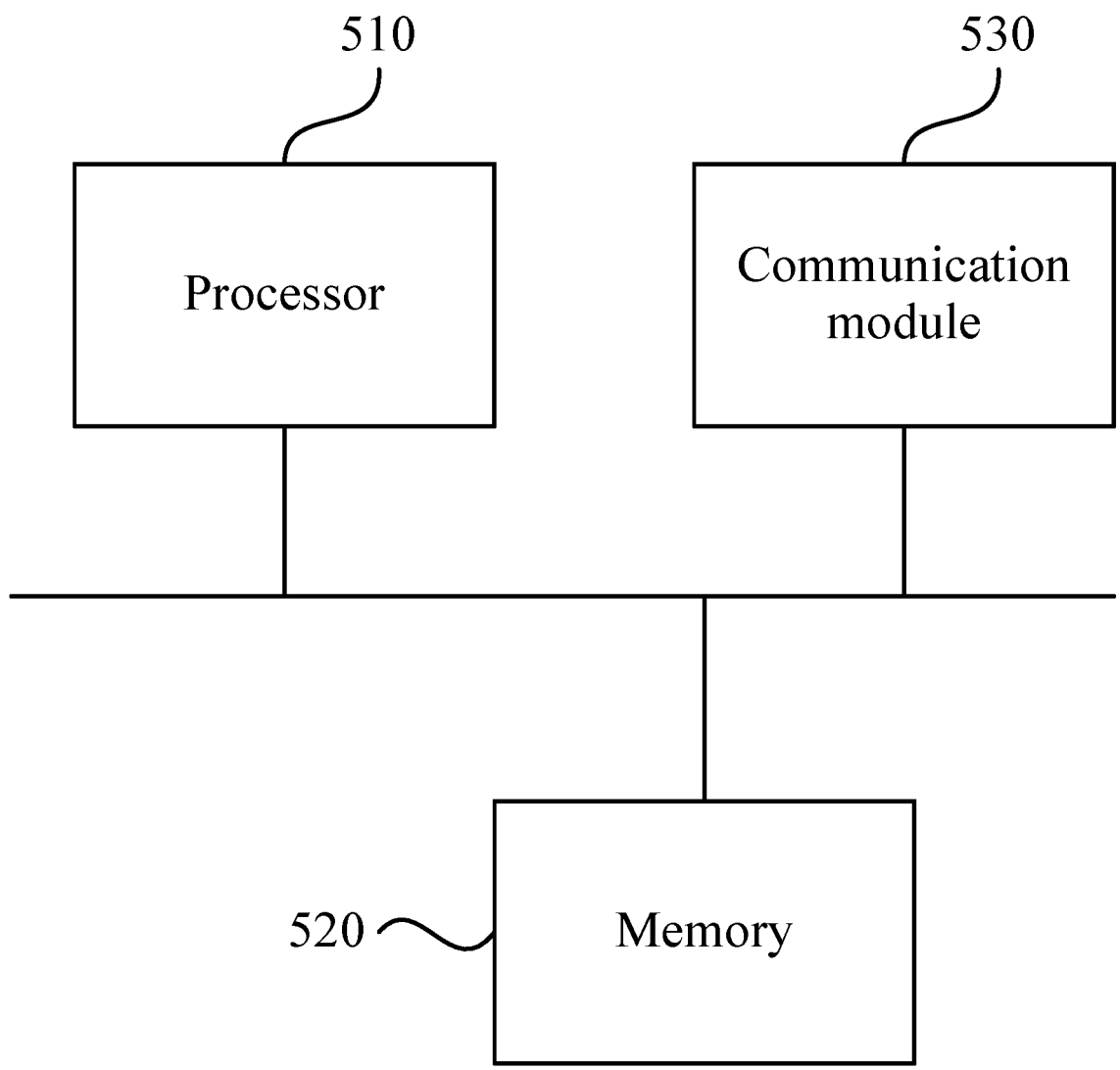
FIG. 6 is a schematic structural diagram of a communication node according to an embodiment of the present application.

FIG. 6 is a schematic structural diagram of a communication node according to an embodiment of the present application. As shown in FIG. 6, the communication node provided by this application includes: a processor 510, a memory 520 and a communication module 530. One or more processors 510 may be provided in the communication node, and one processor 510 is taken as an example in FIG. 6. One or more memories 520 may be provided in the communication node, and one memory 520 is taken as an example in FIG. 6. The processor 510, the memory 520 and the communication module 530 of the communication node may be connected via a bus or in other ways, and the connection via a bus is taken as an example in FIG. 6. In this embodiment, the communication node may be a first communication node, and may be a second communication node, or the like.

As a computer-readable storage medium, the memory 520 may be configured to store a software program, a computer-executable program and a module, such as the program instructions/module corresponding to the communication node according to any embodiment of the present disclosure (e.g., the estimator 410, the input device 420 and the application processor 430 in the apparatus for implementing uplink and downlink channel reciprocity). The memory 520 may include a program storage region and a data storage region, the program storage region may store an operating system and at least one application program required by functions, the data storage region may store data created during utilization of the device, and etc. In addition, the memory 520 may include a high-speed random access memory, and may further include a non-volatile memory, such as at least one magnetic disk storage apparatus, a flash memory device, or other non-volatile solid-state storage apparatus. In some examples, the memory 520 may include memories which are remotely provided with respect to the processor(s) 510, and these remote memories may be connected to the device through a network. Examples of the aforementioned network include, but are not limited to, the Internet, an intranet, a local area network, a mobile communication network, or any combination thereof.

The communication module 530 is configured to communicate and interact with other peer nodes.

The communication node provided above may be configured to execute the method for implementing the uplink and downlink channel reciprocity provided by any of the above embodiments, and have corresponding functions and effects.

A storage medium with computer-executable instructions stored therein is further provided according to embodiments of the present application, the computer-executable instructions, when executed by a computer processor, are configured to implement a method for implementing uplink and downlink channel reciprocity which includes: performing channel estimation in real time according to a received reference signal to obtain a channel estimation result; inputting the channel estimation result into a pre-trained neural network model, where a channel adaptive matrix is output from the pre-trained neural network model; and performing channel adaptation processing for a transmission signal by applying the channel adaptive matrix to the transmission signal.

The term "user equipment (UE)" encompasses any appropriate type of radio user device, such as a mobile phone, a portable data processing apparatus, a portable web browser, or a vehicle-mounted mobile station.

Generally speaking, the various embodiments of the present disclosure may be implemented in hardware or a dedicated circuit, software, logic, or any combination thereof. For example, some aspects of the various embodiments may be implemented in hardware, while other aspects of the various embodiments may be implemented in firmware or software that may be executed by a controller, a microprocessor, or other computing apparatuses, and the present disclosure is not limited thereto.

Embodiments of the present disclosure may be implemented by a data processor of a mobile apparatus executing computer program instructions, for example, the embodiments of the present disclosure may be implemented in a processor entity, by hardware, or by a combination of software and hardware. The computer program instructions may be assembly instructions, instruction set architecture (ISA) instructions, machine instructions, machine-related instructions, micro-codes, firmware instructions, state setting data, or source codes or object codes written in any combination of one or more programming languages.

The block diagrams of any logic flow in drawings of the present disclosure may represent program steps, or may represent interconnected logic circuits, modules, and functions, or may represent a combination of program steps, logic circuits, modules, and functions. The computer programs may be stored in a memory. The memory may be of any type suitable for a local technical environment and may be implemented using any suitable data storage technology, such as, but not limited to, a read-only memory (ROM), a random-access memory (RAM) and an optical memory apparatus and system (digital video disc (DVD) or compact disc (CD)). The computer-readable storage medium may include a non-transitory storage medium. The data processor may be of any type appropriate for the local technical environment such as, but not limited to, a general-purpose computer, a special purpose computer, a microprocessor, a digital signal processor (DSP), an application specific integrated circuit (ASIC), a field-programmable gate array (FPGA), or a processor based on a multi-core processor architecture.

What is claimed is:

1. A method for implementing uplink and downlink channel reciprocity, applied to a communication node, the method comprising:
   performing channel estimation in real time according to a received reference signal to obtain a channel estimation result;
   inputting the channel estimation result into a pre-trained neural network model, to output a channel adaptive matrix; and
   performing channel adaptation processing for a transmission signal by applying the channel adaptive matrix to the transmission signal.

2. The method according to claim 1, wherein, in a case where the communication node is a first communication node, the reference signal is an uplink reference signal; the channel estimation is an uplink channel estimation; the channel estimation result is an uplink channel estimation result; the channel adaptive matrix is a downlink channel adaptive matrix; and the channel adaptation processing is a downlink channel adaptation processing.

3. The method according to claim 1, wherein, in a case where the communication node is a second communication node, the reference signal is a downlink reference signal; the channel estimation is a downlink channel estimation; the channel estimation result is a downlink channel estimation result; the channel adaptive matrix is an uplink channel adaptive matrix; and the channel adaptation processing is an uplink channel adaptation processing.

4. The method according to claim 1, wherein the neural network model comprises: a complex neural network model; the complex neural network model comprises: a complex convolutional neural network model; and the complex convolutional neural network comprises: a complex residual neural network model.

5. The method according to claim 4, wherein, in a case where the neural network model is the complex neural network model, the complex convolutional neural network model or a complex residual network model, a complex error back propagation algorithm is used to train the neural network model.

6. The method according to claim 5, wherein the complex error back propagation algorithm comprises:
a computation expression of a partial derivative or sensitivity of a loss function E to a complex weight and $W_{u,v}^{j,k}$ a complex bias $b_v^k$ of a k-th full-connected layer in the complex neural network model shown as follows:

$$\delta_{W_{u,v}^{j,k}} \triangleq \frac{\partial E}{\partial W_{u,v}^{j,k}} = conj(x_u^j) \cdot conj(f'(x_u^j)) \cdot \delta_{x_v^k}$$

$$\delta_{b_v^k} \triangleq \frac{\partial E}{\partial b_v^k} = \delta_v^k$$

wherein, $W_{u,v}^{j,k}$ represents a complex weight of a connection from a u-th neuron of a j-th layer to a v-th neuron of the k-th layer in the complex neural network model; $b_v^k$ represents a bias of the v-th neuron of the k-th layer in the complex neural network model; $x_u^j$ and $x_v^k$ represent a complex output signal of the u-th neuron of the j-th layer and a complex output signal of the v-th neuron of the k-th layer in the complex neural network model respectively; f'(●) represents a derivative of a neuron activation function to an input signal; and conj(•) represents a conjugate operation on a complex number.

7. The method according to claim 5, wherein the complex error back propagation algorithm comprises:
a computation expression of a partial derivative or sensitivity of a loss function E to a complex weight $\vec{\Lambda}_q^k$ and a complex bias $b_q^k$ of a q-th kernel of a k-th convolutional layer in the complex neural network model shown as follows:

$$\delta_{\vec{\Lambda}_q^k} \triangleq \frac{\partial E}{\partial \vec{\Lambda}_q^k} = \sum_{p=1}^{P} Conv\left(Fliplr\left(conj(\vec{X}_p^j)\right), \vec{\delta}_{\vec{X}_q^k}\right)$$

$$\delta_{b_q^k} \triangleq \frac{\partial E}{\partial b_q^k} = \sum_{v=1}^{V} \delta_{x_{q,v}^k}$$

where, $\vec{X}_p^j$, represents a p-th complex vector outputted by a previous layer, i.e., a j-th layer of the k-th convolutional layer; $\vec{X}_q^k$ and represents a q-th complex vector outputted by the k-th convolutional layer; $\vec{\delta}_{x_q^k} = [\delta_{x_{q,l}^k}, \ldots, \delta_{x_{q,v}^k}, \ldots, \delta_{x_{q,V}^k}]$ represents a partial derivative or sensitivity of the loss function E to the above $\vec{X}_q^k$; Conv(●) represents a convolutional operation, and Fliplr(●) represents flipping a transpose of an input vector, and p represents a total number of complex vectors outputted from the j-th convolutional layer.

8. The method according to claim 1, wherein a training process for the neural network model comprises:
dividing wireless channel scenarios of a frequency division duplexing (FDD) system where the communication node is located into N types of scenarios, wherein N is a positive integer greater than or equal to 1;
performing uplink channel estimation and downlink channel estimation for each type of scenarios according to known training symbols to obtain uplink channel estimation results and first downlink channel estimation results; and
sequentially inputting an uplink channel estimation result of each entry of entries in a data set corresponding to the each type of scenarios into the neural network model to output a respective second downlink channel estimation result, until an error of the respective second downlink channel estimation result with respect to a first downlink channel estimation result served as a training tag meets a preset accuracy, wherein the entries are data pairs each composed of a uplink channel estimation result of the uplink channel estimation results and a respective first downlink channel estimation result of the first downlink channel estimation results.

9. The method according to claim 1, wherein a training process for the neural network model comprises:
performing uplink channel estimation and downlink channel estimation in real time according to known training symbols, to obtain uplink channel estimation results and first downlink channel estimation results; and
sequentially inputting each uplink channel estimation result of uplink channel estimation results into the neural network model, and outputting a respective second downlink channel estimation result, until an error of the respective second downlink channel estimation result with respect to a first downlink channel estimation result served as a training tag meets a preset accuracy.

10. A communication node, comprising: a communication module, a memory, and at least one processor; wherein
the communication module is configured to perform communication interaction between at least two communication nodes;
the memory is configured to store at least one program; and
the at least one program, when being executed by the at least one processor, causes the at least one processor to implement:
performing channel estimation in real time according to a received reference signal to obtain a channel estimation result;
inputting the channel estimation result into a pre-trained neural network model, to output a channel adaptive matrix; and
performing channel adaptation processing for a transmission signal by applying the channel adaptive matrix to the transmission signal.

11. The communication node according to claim 10, wherein, in a case where the communication node is a first communication node, the reference signal is an uplink reference signal; the channel estimation is an uplink channel estimation; the channel estimation result is an uplink channel estimation result; the channel adaptive matrix is a downlink channel adaptive matrix; and the channel adaptation processing is a downlink channel adaptation processing.

12. The communication node according to claim 10, wherein, in a case where the communication node is a second communication node, the reference signal is a downlink reference signal; the channel estimation is a downlink channel estimation; the channel estimation result is a downlink channel estimation result; the channel adaptive matrix is an uplink channel adaptive matrix; and the channel adaptation processing is an uplink channel adaptation processing.

13. The communication node according to claim 10, wherein the neural network model comprises: a complex neural network model; the complex neural network model comprises: a complex convolutional neural network model; and the complex convolutional neural network comprises: a complex residual neural network model.

14. The communication node according to claim 13, wherein, in a case where the neural network model is the complex neural network model, the complex convolutional neural network model or a complex residual network model, a complex error back propagation algorithm is used to train the neural network model.

15. The communication node according to claim 14, wherein the complex error back propagation algorithm comprises:

a computation expression of a partial derivative or sensitivity of a loss function E to a complex weight $W_{u,v}^{j,k}$ and a complex bias $b_v^k$ of a k-th full-connected layer in the complex neural network model shown as follows:

$$\delta_{W_{u,v}^{j,k}} \triangleq \frac{\partial E}{\partial W_{u,v}^{j,k}} = conj(x_u^j) \cdot conj(f'(x_u^j)) \cdot \delta_{x_v^k}$$

$$\delta_{b_v^k} \triangleq \frac{\partial E}{\partial b_v^k} = \delta_v^k$$

wherein, $W_{u,v}^{j,k}$ represents a complex weight of a connection from a u-th neuron of a j-th layer to a v-th neuron of the k-th layer in the complex neural network model; $b_v^k$ represents a bias of the v-th neuron of the k-th layer in the complex neural network model; $x_u^j$ and $x_v^k$ represent a complex output signal of the u-th neuron of the j-th layer and a complex output signal of the v-th neuron of the k-th layer in the complex neural network model respectively; f'(●) represents a derivative of a neuron activation function to an input signal; and conj(•) represents a conjugate operation on a complex number.

16. The communication node according to claim 14, wherein the complex error back propagation algorithm comprises:

a computation expression of a partial derivative or sensitivity of a loss function E to a complex weight $\Lambda_q^k$ and a complex bias $b_q^k$ of a q-th kernel of a k-th convolutional layer in the complex neural network model shown as follows:

$$\vec{\delta}_{\Lambda_q^k} \triangleq \frac{\partial E}{\partial \vec{\Lambda}_q^k} = \sum_{p=1}^{P} Conv\left(Fliplr\left(conj(\vec{X}_p^j)\right), \vec{\delta}_{\vec{X}_q^k}\right)$$

-continued $$\delta_{b_q^k} \triangleq \frac{\partial E}{\partial b_q^k} = \sum_{v=1}^{V} \delta_{x_{q,v}^k}$$

where, $\vec{X}_p^j$ represents a p-th complex vector outputted by a previous layer, i.e., a j-th layer of the k-th convolutional layer; $\vec{X}_q^k$ and represents a q-th complex vector outputted by the k-th convolutional layer; $\vec{\delta}_{X_q^k} = [\delta_{x_{q,1}^k}, \ldots, \delta_{x_{q,i}^k}, \ldots, \delta_{x_{q,V}^k}]$ represents a partial derivative or sensitivity of the loss function E to the above $\vec{X}_q^k$, Conv(●) represents a convolutional operation, and Fliplr(●) represents flipping a transpose of an input vector, and p represents a total number of complex vectors outputted from the j-th convolutional layer.

17. The communication node according to claim 10, wherein a training process for the neural network model comprises:

dividing wireless channel scenarios of a frequency division duplexing (FDD) system where the communication node is located into N types of scenarios, wherein Nis a positive integer greater than or equal to 1;

performing uplink channel estimation and downlink channel estimation for each type of scenarios according to known training symbols to obtain uplink channel estimation results and first downlink channel estimation results; and sequentially inputting an uplink channel estimation result of each entry of entries in a data set corresponding to the each type of scenarios into the neural network model to output a respective second downlink channel estimation result, until an error of the respective second downlink channel estimation result with respect to a first downlink channel estimation result served as a training tag meets a preset accuracy, wherein the entries are data pairs each composed of a uplink channel estimation result of the uplink channel estimation results and a respective first downlink channel estimation result of the first downlink channel estimation results.

18. The communication node according to claim 10, wherein a training process for the neural network model comprises:

performing uplink channel estimation and downlink channel estimation in real time according to known training symbols, to obtain uplink channel estimation results and first downlink channel estimation results; and sequentially inputting each uplink channel estimation result of uplink channel estimation results into the neural network model, and outputting a respective second downlink channel estimation result, until an error of the respective second downlink channel estimation result with respect to a first downlink channel estimation result served as a training tag meets a preset accuracy.

19. A non-transitory computer-readable storage medium, storing a computer program, wherein the computer program, when being executed by a processor, implements:

performing channel estimation in real time according to a received reference signal to obtain a channel estimation result;

inputting the channel estimation result into a pre-trained neural network model, to output a channel adaptive matrix; and performing channel adaptation processing for a transmission signal by applying the channel adaptive matrix to the transmission signal.

\* \* \* \* \*